United States Patent [19]
Ware

[11] 3,917,101
[45] Nov. 4, 1975

[54] OUTLET BOX AND METHOD OF MAKING THE SAME

[75] Inventor: Gordon K. Ware, St. Charles, Ill.

[73] Assignee: Ware Fuse Corporation, Chicago, Ill.

[22] Filed: May 19, 1972

[21] Appl. No.: 255,168

Related U.S. Application Data

[63] Continuation-in-part of Ser. No. 137,146, April 22, 1971, abandoned.

[52] U.S. Cl. .................. 220/3.2; 174/58; 220/3.5; 220/266
[51] Int. Cl.² ............................................. H02G 3/12
[58] Field of Search ............... 220/27, 3.2–3.94, 220/265, 266; 174/53, 57, 58

[56] References Cited
UNITED STATES PATENTS

| | | | |
|---|---|---|---|
| 1,869,646 | 8/1932 | Anderson | 220/3.8 |
| 1,943,001 | 1/1934 | Clayton | 174/58 |
| 2,211,102 | 8/1940 | Davis | 46/193 |
| 2,867,349 | 1/1959 | Parker, Jr. | 220/3.3 |
| 2,959,633 | 11/1960 | Palmer et al. | 220/3.2 |
| 3,028,992 | 4/1962 | Bucher et al. | 220/27 |
| 3,575,313 | 4/1971 | Trachtenberg et al. | 220/3.3 |
| 3,701,451 | 10/1972 | Schindler et al. | 220/27 |
| 3,770,873 | 11/1973 | Brown | 220/27 |
| 3,773,968 | 11/1973 | Copp | 220/27 |

Primary Examiner—William I. Price
Assistant Examiner—Stephen Marcus
Attorney, Agent, or Firm—Olson, Trexler, Wolters, Bushnell & Fosse, Ltd.

[57] ABSTRACT

A molded plastic box for receiving electrical outlets, switches, cover plates and the like of standard size and including a portion insertable through an opening in a wall and projecting laterally of the opening when fully assembled for increasing the interior volume of the box. The box has knockouts with feeder lugs shaped and positioned to insure filling of the knockout cavity during molding of the box. A cover plate is provided that is secured by upset pins integrally molded with the box.

5 Claims, 10 Drawing Figures

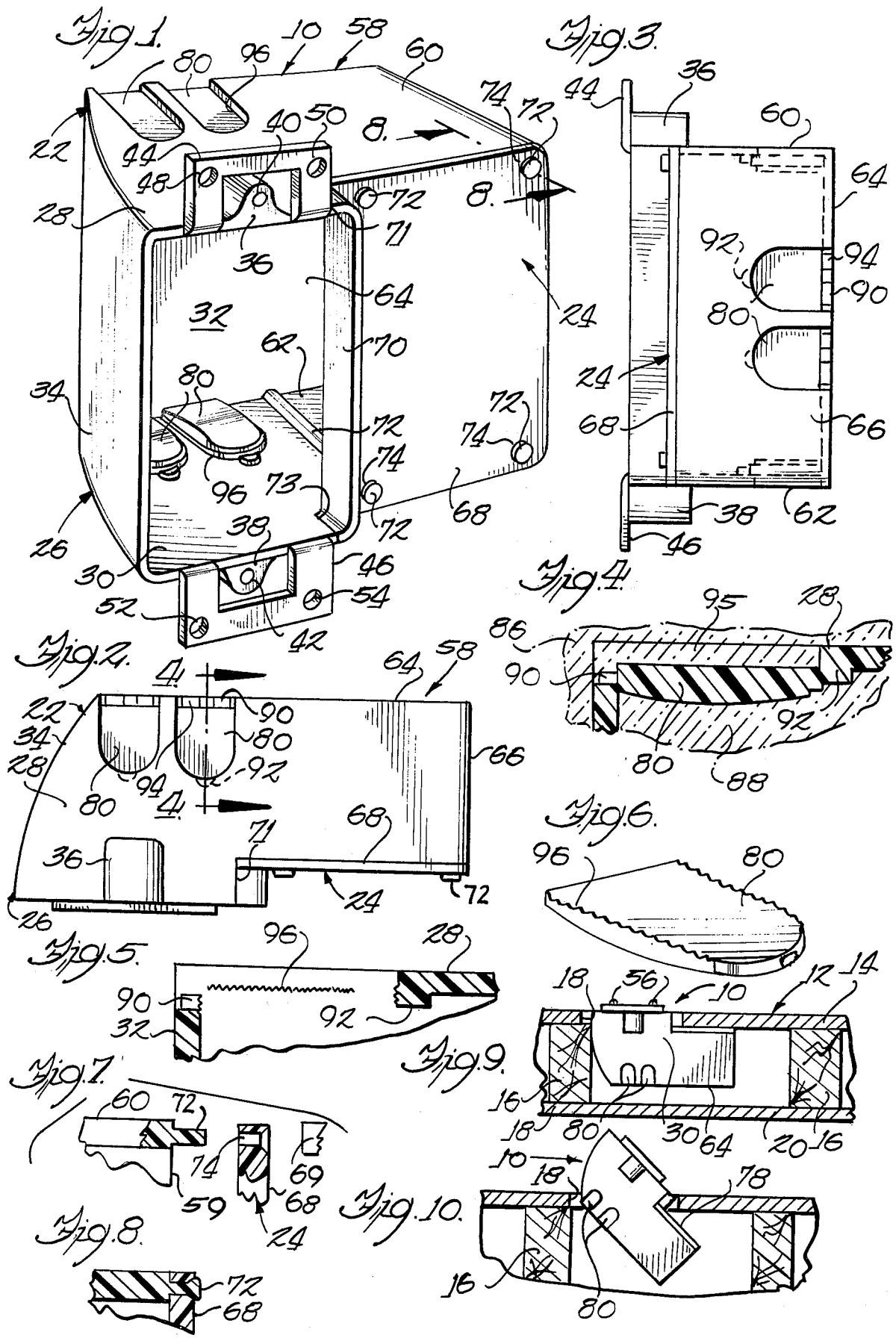

OUTLET BOX AND METHOD OF MAKING THE SAME

CROSS-REFERENCE TO RELATED APPLICATIONS

This application is a continuation-in-part of my copending application Ser. No. 137,146, filed Apr. 22, 1971 and now abandoned. Reference is also made to my copending application Ser. No. 888,258, filed Dec. 29, 1969 now Pat. No. 3,690,501. The disclosures of those applications are by reference incorporated herein.

BACKGROUND OF THE INVENTION

The present invention relates to a novel box or receptacle for receiving electrical components such as outlets, switches and the like and more specifically to a novel receptacle or box especially suitable for use in wiring systems in buildings, mobile homes and the like.

In the construction industry, components for electrical wiring have been standardized as to certain dimensions and sizes. This permits components of various manufacturers to be interchanged with each other. Boxes or receptacles adapted to mount electrical outlets, switches and the like generally have standardized dimensions so that they may receive electrical components of standard size as well as cover plates of standard size.

The receptacles or boxes as well as other components usually must meet the specifications of various electrical codes or standards established by Underwriters. One specification for receptacles or outlet boxes relates to the volume within the box. In many instances prior receptacles or boxes do not have sufficient internal volume to meet code requirements and this is especially true in receptacles or boxes which are to be used in mobile home construction which usually has a thinner wall than a conventional building.

In the aforesaid application Ser. No. 888,258, there is disclosed a box construction incorporating two or more box members adapted to be telescopically associated with and/or assembled from behind a wall to obtain significantly increased volumetric capacity. While such heretofore proposed structures are satisfactory in many instances, the present invention contemplates a novel receptacle or box structure which is of simplified and more economical construction and which may be readily assembled through a wall opening of standard size from the outside thereof while still providing significantly increased internal volumetric capacity.

OBJECTS OF THE INVENTION

It is an important object of the present invention to provide a novel receptacle or box structure having a first portion adapted to receive electrical outlets, switches, cover plates and the like of standard dimensions and a second laterally extending portion for increasing the internal volume of the structure, which receptacle is constructed so that it may be readily assembled through an opening in a wall panel or surface of standard size and then manipulated so as to position said second portion behind the wall panel and the first receptacle portion in alignment with the opening.

Still another object of the present invention is to provide a method of making a novel receptacle or box structure of the above described type from plastic or other suitable materials.

A further important object of this invention is to provide a method of making a receptacle or box of the type stated which results in proper filling of knockout cavities of the box and also results in a box of significantly improved crush strength.

Still another object of the present invention is to provide a novel receptacle or box structure of the above described type having mounting portions which may be readily manipulated for accommodating minor dimensional variations in a wall opening in which the device is to be mounted for minimizing the necessity of holding close manufacturing tolerances.

A still further object of the present invention is to provide a novel receptacle or box structure of the above described type having mounting portions cooperable with fasteners such as screws for minimizing any possibility of inadvertent loosening of the fasteners.

A more specific object of this invention is to provide a box or receptacle of the type stated that includes cooperating box portions defining the volume of the box and wherein one of said box portions has stud elements that are upset to secure a cover over that one box portion.

Another specific object of this invention is to provide a box of the type stated in which the knockouts are supplied plastic during molding from feeders or runners positioned and shaped to insure filling of the knockout cavities, and further wherein the knockouts are centrally enlarged to promote such filling of those cavities.

Other objects and advantages of the present invention will become apparent from the following description and the accompanying drawings wherein:

BRIEF DESCRIPTION OF THE FIGURES

FIG. 1 is a perspective view showing a receptacle or a box structure incorporating features of the present invention;

FIG. 2 is a top plan view of the box;

FIG. 3 is a right hand end view of the box structure shown in FIG. 2;

FIG. 4 is an enlarged fragmentary sectional view through a knockout taken along line 4—4 of FIG. 2, and showing in broken lines mold members for carrying out the method of the invention;

FIG. 5 is a sectional view similar to FIG. 4 but showing the knockout therein removed;

FIG. 6 is a perspective view of the removed knockout;

FIG. 7 is an enlarged exploded fragmentary sectional view taken througn the central axis of one of the cover-securing stud elements and showing the cover preparatory to being mounted on the stud elements;

FIG. 8 is an enlarged fragmentary sectional view taken along line 8—8 of FIG. 1 and showing the assembled cover and box body;

FIG. 9 is a partial sectional view of reduced scale and showing a box of the present invention assembled in a wall; and FIG. 10 is a view similar to FIG. 5 and comprised of a portion thereof and showing an intermediate step of assembly of the box with the wall.

DETAILED DESCRIPTION

Referring now in more detail to the drawings wherein like parts are designated by the same numerals throughout the various figures, a receptacle or box structure 10 is shown which incorporates features of the present invention. The box structure is adapted to be mounted in wall 12 as shown in FIGS. 9 and 10. The box structure may be used in various wall constructions, but is especially suitable for use in walls of mobile homes, which are relatively thin as compared with walls in conventional buildings.

For purposes of illustrating one application of the present invention, the wall 12 comprises a front panel 14 secured to a plurality of studs 16. An opening 18 of conventional dimensions for receiving an outlet box or receptacle is formed in the panel 14. The wall is completed by a back panel 20 secured to the studs oppositely from the front panel 14. As indicated in FIG. 10, the receptacle or box 10 may be assembled with the wall structure prior to the time when the back panel 20 is secured to the studs.

The box structure 10 includes a main body member 22 and a cover member 24. The body member 22 is preferably molded in one piece from a tough resilient fire-resistant plastic material. The cover member 24 is also preferably molded from such a plastic material and the two parts are secured together in a novel manner described below.

The main box or body member 22 is formed with a first box portion 26 having opposite side walls 28 and 30 joined by a bottom wall 32 and an end wall 34. The side and end walls 28, 30, 34 have height which is preferably similar to the thickness of the wall structure 12 and have outer edges or margins terminating in a substantially common plane for projecting through the opening 18 in the wall panel 14 when the box is assembled with the wall as shown in FIG. 9.

Bosses 36 and 38 are integrally formed with the side walls 28 and 30. These bosses respectively have screw or fastener accommodating apertures 40 and 42 formed therein and spaced from each other a distance established by predetermined standards so that the box portion 22 is adapted to receive and mount any standard electrical component such as a switch, electrical outlet or the like.

Mounting ears 44 and 46 are also integrally formed with the opposite side walls 28 and 30 of the box member and project laterally outwardly from upper margins thereof. The mounting ears are preferably in the form of generally U-shaped elements having leg portions integrally joined to the sides of the box and connecting the bight portions. Apertures 48 and 50 are formed in the leg portions of the U-shaped mounting element 44 and similar apertures 52 and 54 are formed in the leg portions of the U-shaped mounting element or ear 46 for accommodating fasteners such as screws and the like.

The plastic material from which the box member is formed is sufficiently tough and rigid to provide the box structure with the desired strength. At the same time, the plastic material is sufficiently resiliently yieldable so that the relatively thin U-shaped mounting elements or ears 44 and 46 may be manually manipulated and stretched or bent to align the fastener receiving apertures therein with complementary apertures or portions of the wall structure into which the fasteners are to be driven.

As shown in FIG. 9, screws 56 are used as the fasteners for securing the box with respect to the wall structure 12. The diameters of the apertures 48, 50, 52 and 54 are initially less than the diameter of the screw shank so that the resilient plastic material of the mounting ears serves tightly to grip the fastening screws in a manner which resists retrograde rotation of the screws and effectively locks the screws against accidental loosening.

In addition to the first portion 26, the main box member 22 includes a second portion 58. The second box portion projects laterally from the first portion and comprises opposite side walls 60 and 62 and a bottom wall 64 which are respectively continuations of the sidewalls 28 and 30 and the bottom wall 32. The box portion 58 also has an end wall 66 oppositely disposed from the end wall 34. Box portions 22 and 58 are in open communication with each other so that the combined interior volumes thereof make up the total capacity of the box structure.

In order to provide clearance for the wall panel when the box structure is assembled in the wall, upper margins of the walls 60, 62 and 66 are disposed in a plane offset from the plane of the upper margins of the walls 28, 30 and 34 a distance similar to but greater than the thickness of the wall panel 14. The cover or top member 24 is preferably molded in one piece and includes a cover panel 68 having a size and shape corresponding to the size and shape of the box portion 58 for completely overlying the upper margins of the wall sections 60, 62 and 66, which define an opening 59 (FIG. 7) into the box portion 58. In addition, the cover member has an upstanding wall or flange portion 70 adapted to abut free upstanding edge portions 71 and 73 of the first box portion walls 28 and 30. The wall section or flange 70 extends so that its outer or upper free marginal edge is disposed in the same plane as the upper edges of the wall sections 28, 30, and 34, whereby those four edges define an opening into the box portion 26 that is opposite from the wall 32. Thus, the flange 70 serves to complete the side enclosure of the box portion 26 by providing a second end wall for the box section 26.

The cover member 24 is permanently secured to the main body member 22. More specifically, the main box member is provided with parallel integral studs 72. The studs 72 extend from the wall 64 and project upwardly from the wall sections 60 and 62 and are arranged for entering complementary apetures 74 located adjacent the four corners of the cover panel 68. At the front face of the panel 68, each aperture 74 may be countersunk as shown in FIGS. 7 and 8. While as indicated above, the plastic material from which the box structure is formed is preferably fire resistant, it is also preferably thermoplastic. However, the cover member may be easily secured to the main box member by first positioning the cover member so that the studs 72 project through their respective apertures 74 in the panel 68. Thereafter, the outwardly projected ends of the studs are upset, as shown in FIG. 8, by the steady application of hydraulic pressure that drives a ram 69 (FIG. 7) or similar upsetting tool. It has been found that by upsetting the ends of the pins or studs 72, the crush strength of the box is increased by the order of 20 percent. The technique of upsetting the ends of the studs 72 avoids melting the plastic and possibly weakening it not only in the stud area but in adjacent areas as well. Moreover, upsetting tends to be a more positive means of cover securement because sometimes the area of stud melt is incomplete, resulting in only a partial interlock between a pin and the cover panel 68.

As shown in FIGS. 9 and 10, the opening 18 of the wall panel 14 with which the box structure is to be assembled is preferably formed so that it has a width similar to but slightly greater than the width of the box portion 26. Preferably the dimensions of the box portion 26 are essentially the same as corresponding dimensions of standard wall outlets or switch boxes and similarly the dimensions of the opening 18 are in accordance with usual standards so that the box and the opening may be covered with a standard switch or cover plate, not shown. The overall height or thickness of the box structure and particularly the box portion 58 is less than the width of the opening 18 in the direction viewed in FIG. 9 so as to permit assembly of the box structure with the wall.

As previously indicated, the box structure 10 is adapted to be assembled with the wall structure 12 from the front or outer side of the panel 14. In assembling the box structure with the wall, the box portion 58 is first inserted through the opening 18 as shown in FIG. 10. It is to be noted that the end wall 34 of the box has an arcuate configuration so as to avoid interference with the edge of the opening 18 during assembly of the box with the wall 12. More specifically, the end wall 34 may have an arcuate configuration with a curvature or radius such that the distance between the outer surface of the wall 34 at all locations and points 78 indicated in FIG. 10 generally at the opposite side of the box portion 26 and engageable with the wall panel 14 during assembly of the box with the wall 12, is not greater than the width of the opening 18. Thus, during assembly of the box with the wall structure 12, the box may be initially inserted through the opening 18 as shown in FIG. 10 and then pivoted generally around the points 78 to the position shown in FIG. 9 at which position the mounting elements or ears 44 and 46 will be flush against the outer surface of the wall panel 14. Final securing of the box in the mounted position is accomplished by applying fasteners 56. While not shown herein, it will be apparent that the wall 34 may have a substantially flat or straight portion extending a short distance from its upper or outer edge.

After the box is assembled with the wall, an electrical outlet, switch or the like may be mounted in the box in the usual fashion. U-shaped knockout elements 80 are provided at any desired location in the various walls of the box structure. These knockout elements are connected with the wall by relatively thin easily rupturable joints so that one or more of the knockout elements can be removed for permitting the connection of electrical wires or conduits with the box in a known manner.

As shown in the drawing a pair of knockout elements 80 is preferably provided in each of the side walls 28 and 30 of the box portion 26. It is to be noted that these knockout portions are not centered with respect to the electrical switch or outlet mounting bosses, but to the contrary, are offset in a direction toward the laterally extending box portion 58. This arrangement provides clearance for the arcuate or curved end wall 34 and also enable wires to be brought into the box at locations selectively offset or in general alignment with the terminals with which they are to be connected so that an electrician may select an arrangement which facilitates the final electrical connection of the wires. In addition to the knockout elements in the opposite sides of the box, similar knockout elements are preferably provided in the end wall 66.

FIGS. 4 and 5 show a typical knockout 80 and adjacent regions in enlarged section, the other knockouts and adjacent box regions being of the like construction.

In addition, there is shown in broken lines, FIG. 4, complementary mold members 86 and 88 that define a mold cavity shaped to the configuration of the body 22, which includes cavity portions for the respective intersecting walls and a cavity portion for the knockout. It will be seen that when plastic is introduced into the mold, the knockout 80 will be formed by plastic that flows through mold cavity portions defining the feeder lugs 90, 92, 94 (See also FIG. 2). The lugs are sufficiently frangible so that the knockout 80 may be ruptured for separation from the box. The knockouts 90, 94 are spaced and are at the junction of two intersecting wall sections, for example wall sections 28, 32. This leaves a recess 95 in the wall (e.g. wall section 28) resulting from the formation of the knockout 80, which is inwardly offset from such wall section but is edgewise joined thereto along a thin frangible line 96 plastic at which the plastic is also fed. The line 96 is a rupture line at which the knockout is fractured as shown in FIGS. 5 and 6. The feeder lug 92 depends inwardly of the wall section 28. Furthermore, the knockout 80 is, as shown in FIGS. 4 and 6, thicker in its center region than at the regions adjacent to the feeder lugs. The several feeder lugs and the centrally thickened knockout assures filling of the knockout cavity during molding since the feed of plastic to the knockout cavity is not restricted to the mold passages that define the thin frangible edge line 96 at the periphery of the knockout, but is also fed by the somewhat thicker passageways that define the feeder lugs.

As previously pointed out, there are knockouts 80 on the walls 28, 30 as well as on the wall 66. Thus, in the total box there are knockouts on three sidewalls, which makes access to the box particularly easy even though the box may be mounted near the junction of two studs or other framing members. This feature is important and enhances the utility of the box where the latter is used as an outlet box.

While a preferred embodiment of the present invention has been shown and described herein, it is obvious that many structural and method details may be changed without departing from the spirit and scope of the appended claims.

The invention is claimed as follows:

1. A box structure for assembly through an opening in a wall panel or the like and having means for supporting an electrical component, means providing a first box portion having opposite side walls, an end wall and a bottom wall, said box portion walls having upper margins at a box-opening opposite from said bottom wall, and means providing a second box portion joined with and extending laterally from said first box portion in a direction opposite from said end wall, said second box portion being in open communication with said first box portion and including a panel offset inwardly from said upper margins and covering an opening into the second box portion, said first box portion including a second end wall portion opposite from said first-mentioned end wall and extending outwardly from said panel for forming part of said upper margins, and deformable studs integral with said second box portion and projecting through said panel, said studs having ends thereof upset to retain the panel permanently over said second box portion.

2. A box structure according to claim 1 in which said box portions, said panel and said deformable studs are of a plastic material.

3. A box structure according to claim 2 in which said first-mentioned end wall is shaped and directed generally toward said second box portion for avoiding interference with an edge of the opening in said wall panel during insertion of the box structure through said last-mentioned opening.

4. A box structure for assembly through an opening in a wall panel or the like, said box structure comprising a one piece plastic body having an opening with means adjacent thereto for mounting an electrical component, said body including two intersecting walls remote from said opening, at least one knockout extending from said intersection and having a peripheral edge portion joining one of two walls, and feeder lugs joining the knockout with said walls, a feeder lug being at the intersection of said two walls and another feeder lug being in the other wall and opposite to the first-mentioned feeder lug, said feeder lugs and said peripheral edge portion constituting a rupturable zone of weakness at which the knockout may be severed from the body, and means forming an additional opening in said body, studs integral with said body at said opening, and a panel member covering said additional opening and with the studs projecting through said panel, ends of said studs being upset to retain the panel permanently over the additional opening.

5. A box structure for assembly through an opening in a wall panel or the like and having means for supporting an electrical component, means providing a first box portion having opposite side walls, an end wall and a bottom wall, said box portion walls having upper margins at a box-opening opposite from said bottom wall, and means providing a second box portion joined with and extending laterally from said first box portion in a direction opposite from said end wall, said second box portion being in open communication with said first box portion and including a panel offset inwardly from said upper margins and covering an opening into the second box portion, studs formed integral with said second box portion and extending therefrom, said panel having openings formed therein to receive said studs, said studs having the ends thereof mechanically upset and enlarged to retain said panel permanently over said second box portion, said first box portion including a second end wall opposite from said first-mentioned end wall and extending outwardly from said panel, said opposite sides and said second end wall each having frangible regions defining knockouts for selective access to said box structure through each of those three walls.

* * * * *